(12) United States Patent
Fujimoto et al.

(10) Patent No.: US 9,522,590 B2
(45) Date of Patent: Dec. 20, 2016

(54) DOOR OPENING/CLOSING CONTROL DEVICE

(71) Applicants: Keigo Fujimoto, Aichi (JP); Yoshiki Yamagishi, Aichi (JP); Yusuke Ueda, Aichi (JP); Sambon Lee, Aichi (JP)

(72) Inventors: Keigo Fujimoto, Aichi (JP); Yoshiki Yamagishi, Aichi (JP); Yusuke Ueda, Aichi (JP); Sambon Lee, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/811,262

(22) Filed: Jul. 28, 2015

(65) Prior Publication Data
US 2016/0026191 A1 Jan. 28, 2016

(30) Foreign Application Priority Data

Jul. 28, 2014 (JP) ................................. 2014-152718

(51) Int. Cl.
*B60R 22/00* (2006.01)
*B60J 5/00* (2006.01)
(Continued)

(52) U.S. Cl.
CPC .................. *B60J 5/00* (2013.01); *E05F 15/73* (2015.01); *H02P 31/00* (2013.01); *E05Y 2400/40* (2013.01);
(Continued)

(58) Field of Classification Search
USPC ............................ 701/49; 318/466, 283, 504
See application file for complete search history.

(56) References Cited

U.S. PATENT DOCUMENTS

| 5,757,156 A * | 5/1998 | Sasajima | ................ E05F 15/70 318/1 |
| 6,208,102 B1 * | 3/2001 | Kikuchi | ............... G05B 19/416 318/282 |

(Continued)

FOREIGN PATENT DOCUMENTS

| JP | 2873831 B2 | 3/1999 |
| JP | 2001-246936 A | 9/2001 |

(Continued)

OTHER PUBLICATIONS

Predictive and Probabilistic Tracking to Detect Stopped Vehicles; Rudy Melli; Andrea Prati; Rita Cucchiara; Lieven de Cock Application of Computer Vision, 2005. WACV/MOTIONS '05 vol. 1. Seventh IEEE Workshops on Year: 2005, vol. 1; pp. 388-393, DOI: 10.1109/ACVMOT.2005.96.*

(Continued)

*Primary Examiner* — Cuong H Nguyen
(74) *Attorney, Agent, or Firm* — Osha Liang LLP

(57) ABSTRACT

An unintentional operation of a door is prevented while the usability of the door is improved. A power back door control device includes: an operation signal acceptor configured to accept an operation signal of a back door opening/closing switch for performing an operation of opening or closing a back door of a vehicle; a controller configured to control opening/closing of the back door via a motor when the operation signal acceptor accepts the operation signal; and a stopping state detector configured to detect whether or not the vehicle is in a stopping state based on information about traveling or stopping of the vehicle acquired by a vehicle-side ECU. When the stopping state detector detects that the vehicle is not in the stopping state, the controller performs fixing control of the back door so as to keep the back door from moving.

2 Claims, 12 Drawing Sheets

(51) Int. Cl.
*H02P 31/00* (2006.01)
*E05F 15/73* (2015.01)

(52) U.S. Cl.
CPC ..... *E05Y 2900/531* (2013.01); *E05Y 2900/546* (2013.01)

(56) References Cited

U.S. PATENT DOCUMENTS

| | | | | |
|---|---|---|---|---|
| 6,484,784 | B1* | 11/2002 | Weik, III | E05F 1/006 160/7 |
| 7,026,777 | B2 | 4/2006 | Matsui et al. | |
| 2003/0025337 | A1* | 2/2003 | Suzuki | E05C 17/60 292/195 |
| 2010/0302022 | A1* | 12/2010 | Saban | B60N 2/002 340/459 |
| 2012/0179336 | A1* | 7/2012 | Oakley | E05F 15/20 701/49 |
| 2014/0039766 | A1* | 2/2014 | Miyake | B60R 25/245 701/49 |

FOREIGN PATENT DOCUMENTS

| | | | |
|---|---|---|---|
| JP | 2003/253961 A | 9/2003 | |
| JP | 2005-105584 A | 4/2005 | |
| JP | 2005-307692 A | 11/2005 | |
| JP | 2007238014 A * | 9/2007 | ............. B60J 5/000 |
| JP | 2008-308923 A | 12/2008 | |
| JP | 2014-066076 A | 4/2014 | |

OTHER PUBLICATIONS

A new mobility interface for the elderly to expand their scope of activities—The Slide Flex;Misato Nihei; Naohiko Harue; Minoru Kamata; 2012 IEEE/RSJ International Conference on Intelligent Robots and Systems; Year: 2012; pp. 341-348, DOI: 10.1109/IROS.2012.6386076.*

Design and implementation of architecture, classifier and integrator for the Next Generation Urban Transportation U-Board; M. Vicky Ghani Aziz; Ary Setijadi Prihatmanto; Hilwadi Hindersah; System Engineering and Technology (ICSET), 2012 International Conference on; Year: 2012; pp. 1-6, DOI: 10.1109/ICSEngT.2012.6339354.*

Driver safety awareness and assistance system for cognitive vehicle control; Janani. N; Saranya. N; Advanced Communication Control and Computing Technologies (ICACCCT), 2014 International Conference on; Year: 2014; pp. 968-973, DOI: 10.1109/ICACCCT.2014.7019238.*

An en-route security monitoring system for commercial vehicles; Hao Wang; Ruey Long Cheu; Der-Horng Lee; Intelligent Transportation Systems, 2003. Proceedings. 2003 IEEE; Year: 2003, vol. 1; pp. 543-547 vol. 1, DOI: 10.1109/ITSC.2003.1252012.*

* cited by examiner

<Auto-opening process, auto-closing process>

<Power assisting process>

<Fixing control process>

DOOR OPENING/CLOSING CONTROL DEVICE

CROSS-REFERENCE TO RELATED APPLICATION

This application is based on Japanese Patent Application No. 2014-152718 filed with the Japan Patent Office on Jul. 28, 2014, the entire contents of which are incorporated herein by reference.

FIELD

The disclosure relates to a door opening/closing control device that controls opening/closing of a door such as a back door or a slide door of a vehicle.

BACKGROUND

As a door opening/closing control device that is mounted in a vehicle, for example, there are a power back door (also referred to as "power tail gate") control device, and a power slide door control device. These door opening/closing control devices control opening/closing of a door such as a back door or a slide door via an actuator such as a motor.

Some door opening/closing control devices are provided with an auto-opening/closing function or a power assisting function. The auto-opening/closing function is a function of driving a motor or the like in accordance with an opening/closing operation of an operation switch provided in a driver's seat or a back part of a vehicle, a remote controller or the like, to automatically open or close the door. The power assisting function is a function of applying operation assisting force by a motor or the like at the time of the door being manually operated for opening or closing, to allow a user to perform an operation of opening or closing the door by small force.

For example, Unexamined Japanese Patent Publication No. 2003-253961, Unexamined Japanese Patent Publication No. 2005-307692, Unexamined Japanese Patent Publication No. 2014-66076 and Unexamined Japanese Patent Publication No. 2005-105584 each disclose a door opening/closing control device provided with the auto-opening/closing function.

The door opening/closing control device of Unexamined Japanese Patent Publication No. 2003-253961 performs an operation of opening or closing a slide door in accordance with a slide door operation signal from a portable controller. Then, when receiving the slide door operation signal again from the portable controller during the opening/closing operation, the door opening/closing control device reversely drives the slide door.

The door opening/closing control device of Unexamined Japanese Patent Publication No. 2005-307692 determines whether to open or close the back door based on an input signal from a touch sensor installed in a back pillar of a vehicle when an ID code transmitted to the outside via a vehicle mounted machine agrees with an ID code of a mobile machine received in the vehicle mounted machine. Then, in accordance with a result of the determination, the door opening/closing control device automatically opens or closes the back door.

The door opening/closing control device of Unexamined Japanese Patent Publication No. 2014-66076 accepts a closing operation signal based on a closing operation of a door opening/closing switch, to execute closing control of a slide door. Further, during this closing control, when detecting that a vehicle is in a traveling state based on signals from a vehicle speed sensor, a foot brake sensor and a parking brake sensor, the door opening/closing control device executes slow-speed closing control of closing the slide door at a slower speed than an ordinary speed.

The door opening/closing control device of Unexamined Japanese Patent Publication No. 2005-105584 is connected with a clutch and transmits driving force from a driving source to a back door, to automatically get the back door opened or closed. Further, in a case where the back door is not being automatically operated, when detecting that a vehicle is in a traveling state based on states of an engine, a shift lever and the like, the door opening/closing control device is connected with the clutch and sets locks on from the driving source to the back door, thereby preventing occurrence of unusual noise due to vibration during traveling.

Moreover, for example, Unexamined Japanese Patent Publication No. 2001-246936 and Unexamined Japanese Patent Publication No. 2008-308923 each disclose a door opening/closing control device provided with the power assisting function.

The door opening/closing control device of Unexamined Japanese Patent Publication No. 2001-246936 detects operation force applied to a door handle, to generate force for assisting an operation of opening or closing the slide door by a motor. Further, at the time of opening the slide door, the door opening/closing control device controls the assist force so as to increase it in accordance with an increase in operation force of the door handle and to decrease it in accordance with an increase in vehicle speed. On the other hand, at the time of closing the slide door, the door opening/closing control device controls the assist force so as to increase it in accordance with an increase in operation force of the door handle and to increase it in accordance with an increase in vehicle speed.

The door opening/closing control device of Unexamined Japanese Patent Publication No. 2008-308923 detects opening/closing operation force to a door knob, to calculate a drive command value of a motor based on the opening/closing operation force. Then, when detecting that a vehicle is in a stopping state based on states of a shift lever and a side brake, the door opening/closing control device outputs the calculated drive command value to a motor drive controller. Thereby, a motor is driven in accordance with the drive command value, leading to generation of assist force for assisting opening/closing of the slide door. On the other hand, when detecting that the vehicle is not in the stopping state, the door opening/closing control device outputs to the motor drive controller a drive command value (=0) for not assist-driving the motor. This prevents generation of the assist force.

A door opening/closing control device of Japanese Patent No. 2873831 detects operation force for performing an operation of opening or closing a slide door by an operation force sensor provided in a handle of the slide door, to generate assist force by a motor in accordance with the operation force. Then, the door opening/closing control device powers off the motor when detecting by a vehicle speed sensor that the vehicle has started high-speed traveling. This prevents the slide door from being freely opened by driving of the motor due to careless touch on the handle.

SUMMARY

Improvement in usability of the door of the vehicle is desirable for the user. For example, when large luggage is to be carried by a vehicle, when the large luggage is loaded on a back cargo bed of the vehicle, the vehicle may want to be travelled with its back door in a moderately open state since the back door cannot be completely closed.

However, when the vehicle is started with its door in such an opened state, the door may be operated in an opening direction or closing direction without the user's intention due to acceleration of the vehicle. Further, during traveling of the vehicle with its door in the open state, due also to a position of the door or roughness of a road, the door may be operated in the opening direction or closing direction by a function of gravity, vibration or impact without the user's intention. In these cases, for example in the door opening/closing control device provided with the power assisting function, it may be erroneously detected that the door has been operated by manual operation, and the power assisting function may be acted without the user's intention, to cause the door to be further operated in the opening or closing direction.

Moreover, the user may make the vehicle travel while being unaware that the door is open. Also at that time, it is highly dangerous when the door is operated in the opening or closing direction without the user's intention, One or more embodiments of the disclosure provide a door opening/closing control device capable of preventing unintentional operation of a door while improving the usability of the door.

A door opening/closing control device according to one or more embodiments of the disclosure includes: an operation signal acceptor configured to accept an operation signal of an operation switch for performing an operation of opening or closing a door of a vehicle; a controller configured to control opening/closing of the door via an actuator when the operation signal acceptor accepts the operation signal; and a stopping state detector configured to detect whether or not the vehicle is in a stopping state based on information about traveling or stopping of the vehicle acquired by a vehicle-side unit. When the stopping state detector detects that the vehicle is not in the stopping state, the controller performs fixing control of the door so as to keep the door from moving.

According to the above, since the door is fixed so as not to move during traveling of the vehicle, it is possible to prevent the door from being operated in the opening or closing direction without the user's intention due to acceleration of the vehicle, gravity applied to the door, vibration caused by roughness of a road, or external force such as impact. Further, even when the vehicle is travelled with its door in an open state, the door does not move from that position, whereby it is possible to improve the usability of the door while ensuring safety.

Moreover, in one or more embodiments of the disclosure, the door opening/closing control device may further include a position detector configured to detect an opening/closing position of the door. In this case, when the stopping state detector detects that the vehicle is not in the stopping state and the position detector detects that the door is not at a fully closed position, the controller performs fixing control of the door via the actuator.

Moreover, in one or more embodiments of the disclosure, in the door opening/closing control device, when the operation signal acceptor at least accepts a closing operation signal of the operation switch for performing the operation of closing the door during fixing control of the door, the controller may cancel the fixing control of the door and perform control so as to close the door via the actuator.

Moreover, in one or more embodiments of the disclosure, the door opening/closing control device may further include a manual opening/closing detector configured to detect that the door has been manually opened or closed. In this case, at the time of the stopping state detector detecting that the vehicle is in the stopping state, when the manual opening/closing detector detects the manual opening/closing operation of the door, the controller may control opening/closing of the door via the actuator so as to assist the manual opening/closing operation of the door. Further, at the time of the stopping state detector detecting that the vehicle is not in the stopping state, even when the manual opening/closing detector detects the manual opening/closing operation of the door, the controller may perform fixing control of the door.

According to one or more embodiments of the disclosure, it is possible to provide a door opening/closing control device capable of preventing unintentional operation of a door while improving the usability of the door.

DETAILED DESCRIPTION

Hereinafter, one or more embodiments of the disclosure will be described with reference to the drawings. In the respective drawings, the same portions or the corresponding portions are provided with the same numeral.

First, a configuration of the embodiment will be described with reference to FIGS. 1 and 2.

Figure 1:
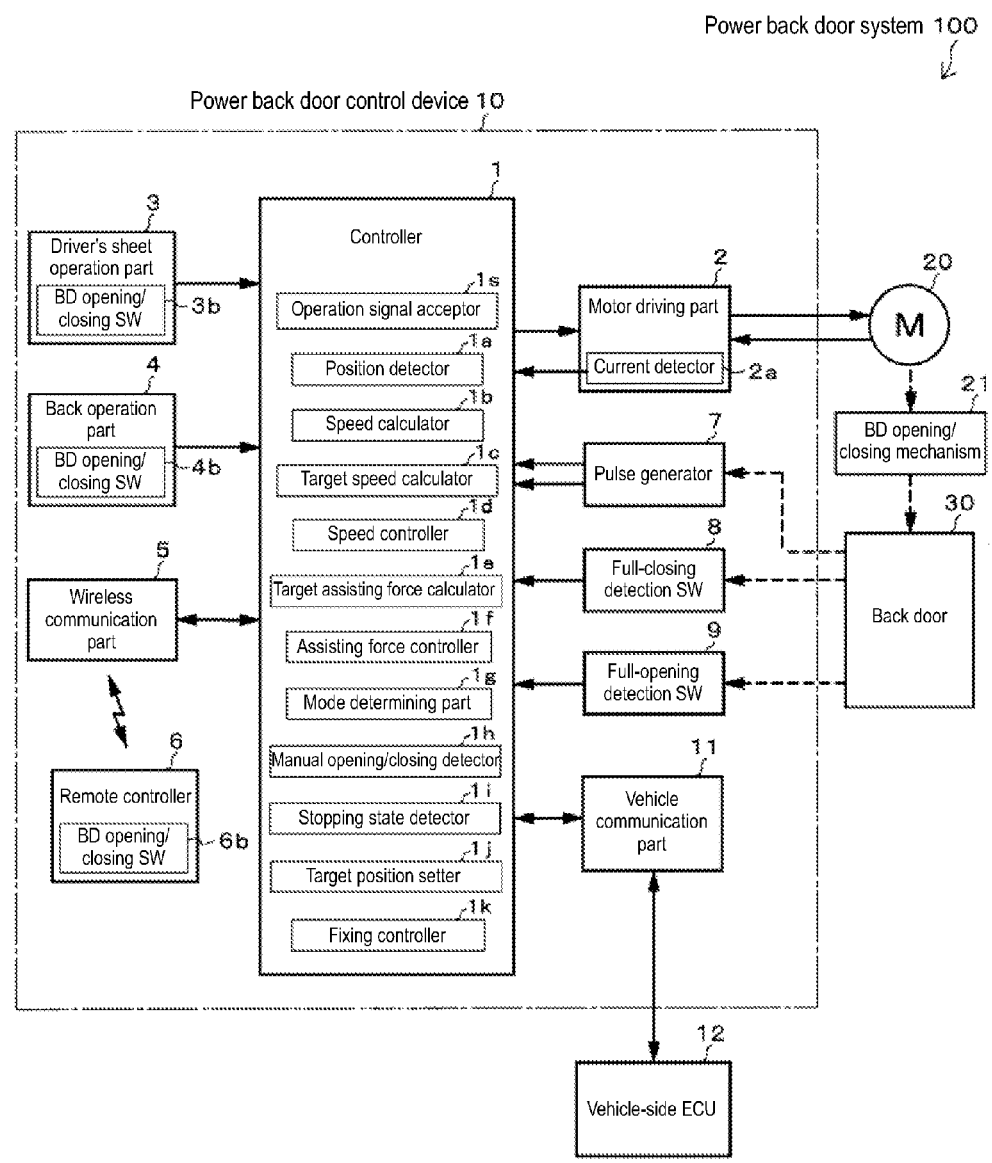
FIG. 1 is a diagram showing a configuration of a power back door control device according to one or more embodiments of the disclosure.

FIG. 1 is a diagram showing a configuration of a power back door control device 10. FIG. 2 is a view showing one example of a back door 30.

In FIG. 1, the power back door control device 10 is incorporated into a power back door system 100 along with a motor 20, a BD (back door) opening/closing mechanism 21 and the back door 30. This power back door system 100 is mounted in an automatic four-wheel car.

Figure 2:
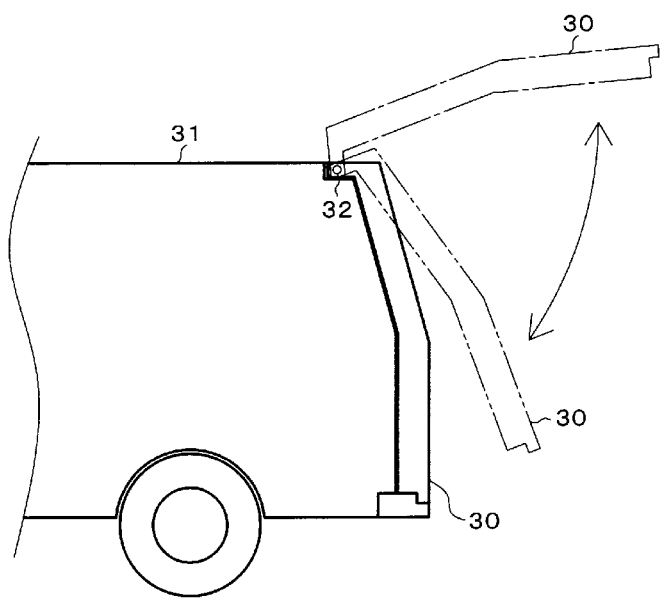
FIG. 2 is a view showing one example of a back door.

The power back door control device 10 is provided in a car body 31 of FIG. 2. The BD opening/closing function 21 for opening/closing the back door 30 is provided in the car body 31 and the back door 30. The motor 20 is a power source of the BD opening/closing function 21, and provided in the car body 31.

As shown in FIG. 2, the back door 30 is made up of a flip-up door provided on the back surface of the car body 31 of the automatic four-wheel car. The back door 30 is getting open by its lower end swinging upward around a rotation axis 32 located at its upper end, and is conversely getting closed by its lower end swinging downward. In FIG. 2, the back door 30 being at the fully closed position is indicated by a solid line. The back door 30 being at the fully opened position is indicated by a dashed line. The back door 30 being at the intermediate position between the fully closed position and the fully opened position is indicated by a chain double-dashed line.

The back door 30 is locked by a locking mechanism, not shown, when it is at a fully closed position. For this reason, the back door 30 at the fully closed position does not automatically move in the opening direction.

The power back door control device 10 activates the BD opening/closing function 21 by driving the motor 20 by normal rotation or reverse rotation, to automatically open or close the back door 30 (auto-opening/closing function). When the back door 30 being at the fully closed position is to be automatically opened, locking of the back door 30 by the foregoing locking mechanism is automatically cancelled.

It is possible to manually perform the operation of opening or closing of the back door 30 by holding its lower end or gripper (not shown). When the operation of opening or closing the back door 30 is manually performed, the power back door control device 10 applies operation assisting force by the motor 20, to allow the user to perform the operation of opening or closing the back door 30 by small force (power assisting function). When the back door 30 being at the fully closed position is to be manually opened, locking of the back door 30 by the foregoing locking mechanism is manually or automatically cancelled.

As described above, the power back door control device 10 is provided with the auto-opening/closing function and the power assisting function for the back door 30. The power back door control device 10 is one example of the "door opening/closing control device" of the disclosure. The back door 30 is one example of the "door" of the disclosure. The motor 20 is one example of the "actuator" of the disclosure.

The power back door control device 10 includes a controller 1, a motor driving part 2, a driver's seat operation part 3, a back operation part 4, a wireless communication part 5, a remote controller 6, a pulse generator 7, a full-closing detection SW (switch) 8, a full-opening detection SW (switch) 9, and a vehicle communication part 11.

The controller 1 is made up of a microcomputer. The controller 1 is provided with an operation signal acceptor 1s, a position detector 1a, a speed calculator 1b, a target speed calculator 1c, a speed controller 1d, a target assisting force calculator 1e, an assisting force controller 1f, a mode determining part 1g, a manual opening/closing detector 1h, a stopping state detector 1i, a target position setter 1j, and a fixing controller 1k.

The motor driving part 2 is made up of a drive circuit for driving the motor 20 by a PWM (Pulse Width Modulation) signal. The controller 1 controls driving of the motor 20 by the motor driving part 2. The motor driving part 2 is provided with a current detector 2a for detecting an electric current flowing in the motor 20 (hereinafter referred to as "motor current"). The detection of the motor current by the current detector 2a is performed suitably or in a predetermined period.

The driver's seat operation part 3 is made up of a switch, a button and the like provided at the driver's seat of the automatic four-wheel car. The back operation part 4 is made up of a switch, a button, and the like provided at the back of the car body 31 (outside the car). The driver's seat operation part 3 and the back operation part 4 are respectively provided with BD opening/closing SWs (switches) 3b, 4b that are operated for instructing opening/closing or stopping of the back door 30. When the BD opening/closing SWs 3b, 4b are operated by the user, the operation signal acceptor 1s of the controller 1 accepts an operation signal indicating the operation state.

The wireless communication part 5 is made up of an antenna and a circuit for performing wireless communications (communications by an LF (Low Frequency) signal, a UHF (Ultra High Frequency), etc.) with the remote controller 6. The remote controller 6 is made up of an FOB key in a passive entry system, and carried by the user.

The remote controller 6 is also provided with a BD opening/closing SW (switch) 6b that is operated for instructing opening/closing or stopping of the back door 30. When the user operates the BD opening/closing SW 6b, the remote controller 6 wirelessly transmits an operation signal indicating the operating state. Then, the wireless communication part 5 receives the operation signal from the remote controller 6, and the operation signal acceptor 1s of the controller 1 accepts the operation signal.

The operation signals of the BD opening/closing SWs 3b, 4b, 6b include an opening operation signal transmitted at the time of performing an opening operation of the BD opening/closing SW 3b, 4b, 6b, a closing operation signal transmitted at the time of performing a closing operation of the BD opening/closing SW 3b, 4b, 6b, and a stopping operation signal transmitted at the time of performing a stopping operation of the BD opening/closing SW 3b, 4b, 6b. The BD opening/closing SWs 3b, 4b, 6b are one example of the "operation switch" of the disclosure.

The pulse generator 7 is, for example, made up of a two-phase rotary encoder, and is provided in the motor 20 or the BD opening/closing function 21. The pulse generator 7 outputs two pulse signals with shifted phases to the controller 1 in accordance with a rotating state of the motor 20 or an operating state of the BD opening/closing function 21.

The rotating state of the motor 20, the operating state of the BD opening/closing function 21 and the opening/closing state of the back door 30 are interlocked. For this reason, the position detector 1a of the controller 1 detects two pulse signals outputted from the pulse generator 7, and detects an opening/closing position of the back door 30 (hereinafter referred to as "door position") based on the pulse signals. The speed calculator 1b calculates an opening/closing speed of the back door 30 (hereinafter referred to as "door speed") based on a temporal change in the door position detected by the position detector 1a. The detection of the door position by the position detector 1a and the calculation of the door speed by the speed calculator 1b are performed suitably or in a predetermined cycle as needed.

The full-closing detection SW (switch) 8 and the full-opening detection SW (switch) 9 are provided at the back of the car body 31. The full-closing detection SW 8 detects that the back door 30 is fully closed and outputs a detection signal to the controller 1. The full-opening detection SW 9 detects that the back door 30 is fully opened and outputs a detection signal to the controller 1. The position detector 1a detects that the back door 30 is at a fully closed position or a fully opened position based on the output signal from the full-closing detection SW 8 or the full-opening detection SW 9.

The controller 1 controls the driving of the motor 20 via the motor driving part 2 in accordance with an operation signal from the BD opening/closing SW 3*b*, 4*b*, 6*b*. Specifically, the controller 1 rotates the motor 20 by the motor driving part 2 in accordance with an opening/closing operation signal from the BD opening/closing SWs 3*b*, 4*b*, 6*b*. Further, it stops the motor 20 by the motor driving part 2 in accordance with the stopping operation signal from the BD opening/closing SWs 3*b*, 4*b*, 6*b*. Thereby, the back door 30 is automatically opened or closed, or stopped.

At the time of driving the motor 20 in accordance with the opening/closing operation signal of the BD opening/closing SW 3*b*, 4*b*, 6*b*, the target speed calculator 1*c* calculates a target speed for automatically opening or closing the back door 30 based on the door position detected by the position detector 1*a*. The speed controller 1*d* then controls a speed of the motor 20 based on that target speed and the door speed calculated by the speed calculator 1*b*.

The manual opening/closing detector 1*h* detects that the operation of opening or closing the back door 30 has been manually performed. Specifically, for example, when the speed controller 1*d* is not controlling the driving of the motor 20, unless the door speed calculated by the speed calculator 1*b* is 0, the manual opening/closing detector 1*h* judges that the operation of opening or closing the back door 30 has been manually performed. Further, when the door speed is 0, the manual opening/closing detector 1*h* judges that the operation of opening or closing the back door 30 has not been manually performed.

When the manual opening/closing detector 1*h* detects the manual operation of opening or closing the back door 30, the controller 1 controls the driving of the motor 20 via the motor driving part 2 so as to assist the manual operation of opening or closing the back door 30. Specifically, the target assisting force calculator 1*e* calculates target assisting force based on the door position detected by the position detector 1*a* and the door speed calculated by the speed calculator 1*b*. The assisting force controller 1*f* controls the driving of the motor 20 via the motor driving part 2 based on that target assisting force and the motor current detected by the current detector 2*a*.

The vehicle communication part 11 is made up of a circuit for having mutual communication with a vehicle-side ECU (electric control unit) 12 via CAN (Controller Area Network) or the like. Vehicle information about traveling and stopping of the vehicle is transmitted as needed from the vehicle-side ECU 12 to the power back door control device 10. This vehicle information includes a vehicle speed, states of a brake and a shift lever, and the like, for example. The vehicle communication part 11 receives the vehicle information transmitted from the vehicle-side ECU 12. The vehicle-side ECU 12 is one example of the "vehicle-side unit" of the disclosure.

The stopping state detector 1*i* detects whether or not the vehicle is in the stopping state based on the vehicle information acquired by the vehicle communication part 11 from the vehicle-side ECU 12. Specifically, for example, the stopping state detector 1*i* detects that the vehicle is in the stopping state when acquiring such vehicle information that the vehicle speed is 0, the brake is on, the parking brake is on, or the shift lever is at a parking position. Further, for example, the stopping state detector 1*i* detects that the vehicle is not in the stopping state (namely it is in the traveling state) when acquiring such vehicle information that the vehicle speed is not 0, the brake is not on, the parking brake is not on, or the shift lever is not at the parking position.

When the stopping state detector 1*i* detects that the vehicle is not in the stopping state, the target position setter 1*j* of the controller 1 sets a target position of the back door 30 based on the door position detected by the position detector 1*a*. Specifically, the target position setter 1*j* sets as the target position the current position of the back door 30 detected in the position detector 1*a*. Then, based on the target position set in the target position setter 1*j* and a door position detected as needed in the position detector 1*a*, the fixing controller 1*k* performs fixing control of the back door 30 via the motor driving part 2 and the motor 20 so as to keep the back door 30 from moving.

The mode determining part 1*g* determines a mode for controlling the back door 30 based on an acceptance result of the operation signal acceptor 1*s*, a detection result of the position detector 1*a*, a detection result of the manual opening/closing detector 1*h*, a detection result of the stopping state detector 1*i*, the current mode, or the like. Information indicating the current mode or the mode determined in the mode determining part 1*g* is stored into an internal memory of the controller 1.

Next, an operation of the power back door control device 10 will be described with reference to FIGS. 3 to 12.

Figure 3:
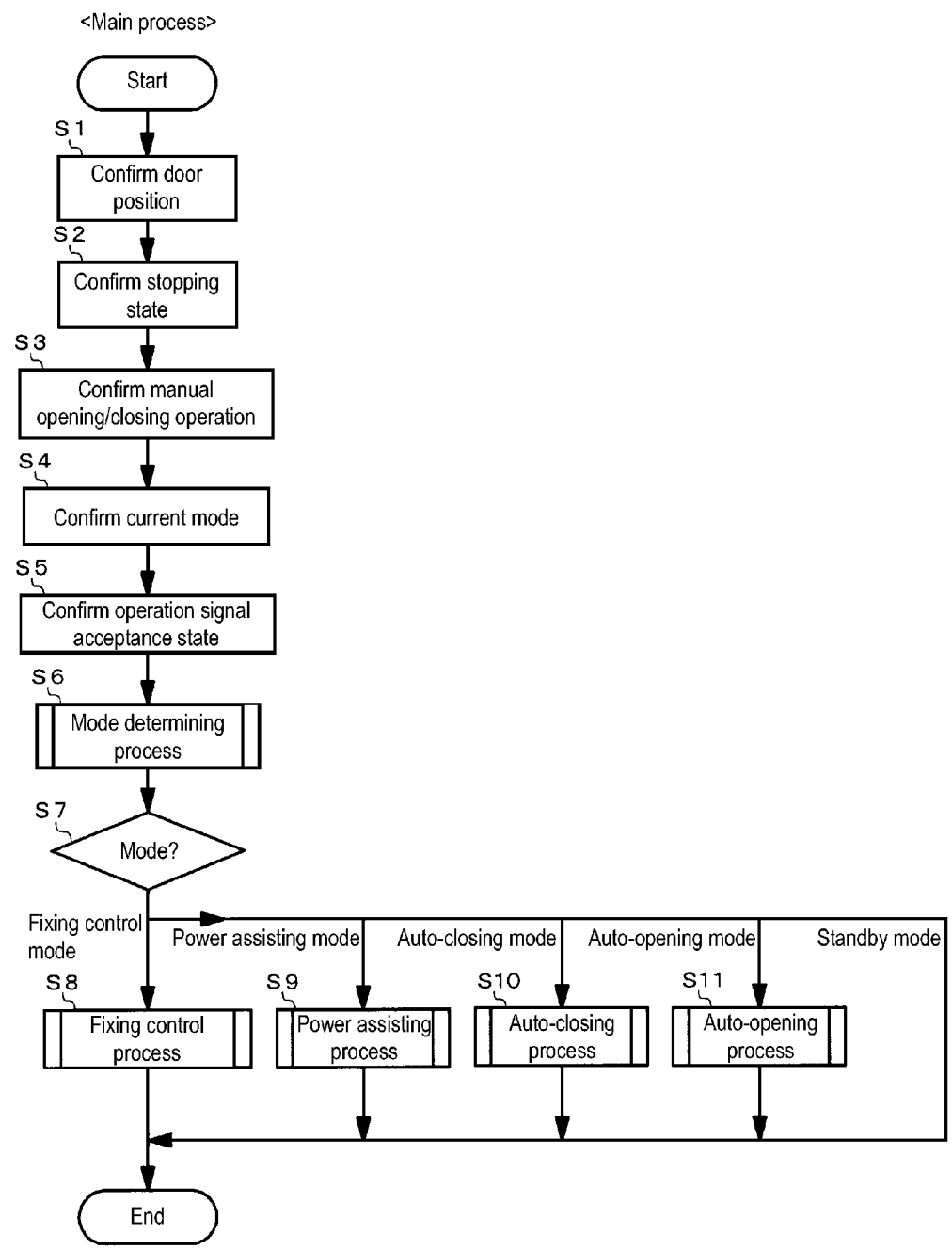
FIG. 3 is a flowchart showing a main process of the power back door control device of FIG. 1.

FIG. 3 is a flowchart showing a main process of the power back door control device 10. The controller 1 executes this main process in a predetermined period.

In FIG. 3, the controller 1 confirms the door position by the position detector 1*a* (Step S1 of FIG. 3), confirms the stopping state of the vehicle by the stopping state detector 1*i* (Step S2 of FIG. 3), and confirms the manual opening/closing state of the back door 30 by the manual opening/closing detector 1*h* (Step S3 of FIG. 3). Further, the controller 1 confirms the mode currently in process (Step S4 of FIG. 3), and confirms the acceptance states of operation signals of the BD opening/closing SWs 3*b*, 4*b*, 6*b* by the operation signal acceptor 1*s* (Step S5 of FIG. 3). Each of the processes in Steps S1 to S5 is performed in a sequence not restricted to that of FIG. 3, but may be performed in another sequence or in parallel.

Next, the controller 1 performs a mode determining process by the mode determining part 1*g* based on confirmation results of Steps S1 to S5 (Step S6 of FIG. 3).

Figure 4:
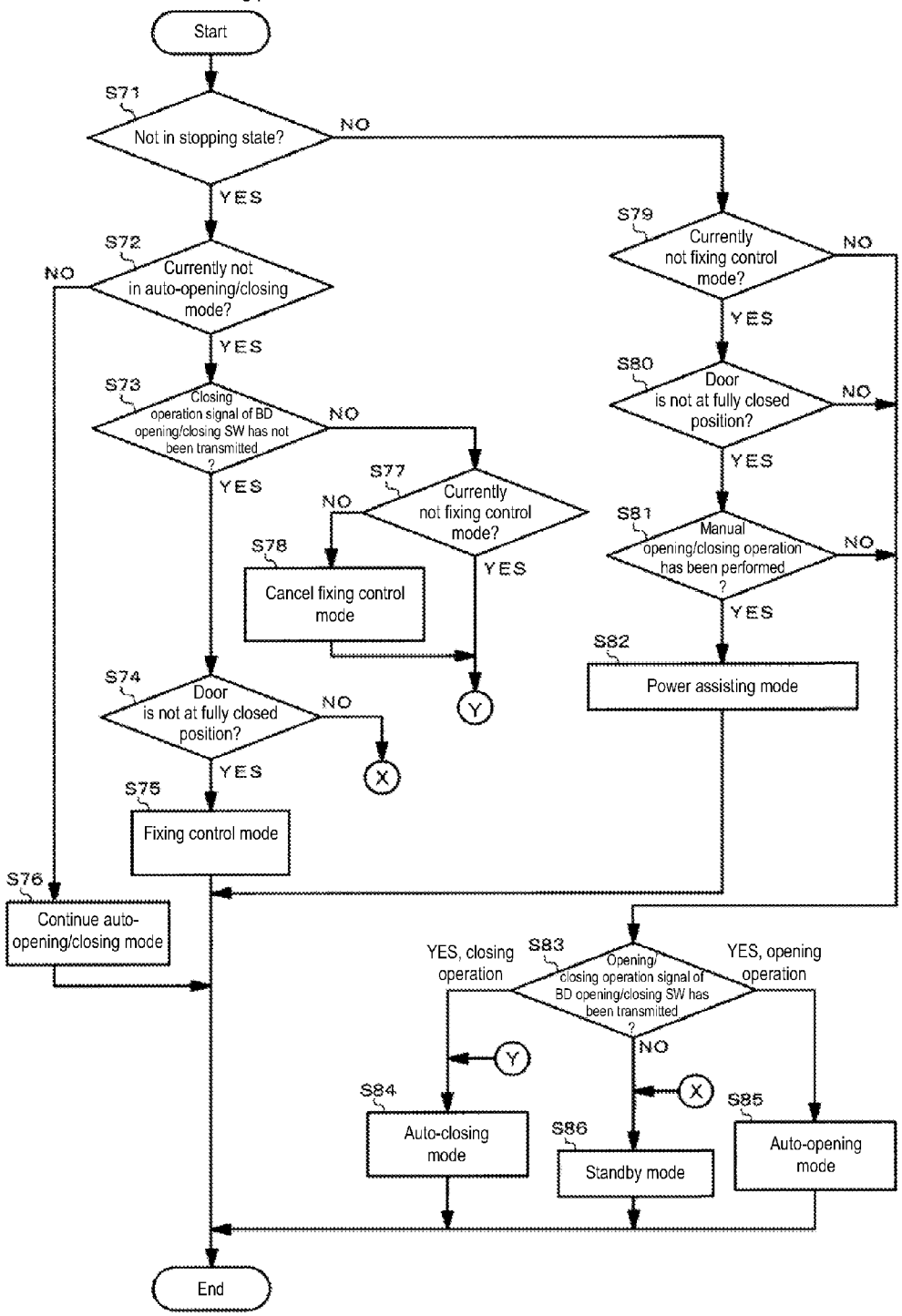
FIG. 4 is a flowchart showing a detail of a mode determining process of FIG. 3.

FIG. 4 is a flowchart showing a detail of the mode determining process. Next, based on the foregoing confirmation results of Steps S1 to S5 of FIG. 3, the controller 1 and the mode determining part 1*g* determine the mode as follows.

In FIG. 4, when the vehicle is not in the stopping state (Step S71 of FIG. 4: YES), namely it is in the traveling state, and the current mode is an auto-opening mode or an auto-closing mode (Step S72 of FIG. 4: NO), the controller 1 continues the current auto-opening mode or auto-closing mode (Step S76 of FIG. 4).

Further, it is assumed that, when the vehicle is in the traveling state (Step S71 of FIG. 4: YES) and the current mode is neither the auto-opening mode nor the auto-closing mode (Step S72 of FIG. 4: YES), the closing operation is performed by any of the BD opening/closing SWs 3*b*, 4*b*, 6*b*. In this case, the mode determining part 1*g* confirms that the closing operation signal of any of the BD opening/closing SWs 3*b*, 4*b*, 6*b* has been accepted in the operation signal acceptor 1*s* (Step S73 of FIG. 4: NO). Then, when the current mode is not a fixing control mode (Step S77 of FIG. 4: YES), the mode determining part 1*g* determines that the switching destination is the auto-closing mode (Step S84 of FIG. 4). Further, when the current mode is the fixing control mode (Step S77 of FIG. 4: NO), the mode determining part 1g cancels the fixing control mode (Step S78 of FIG. 4) and determines that the switching destination is the auto-closing mode (Step S84 of FIG. 4).

Further, it is assumed that the vehicle is in the traveling state (Step S71 of FIG. 4: YES), that the current mode is neither the auto-opening mode nor the auto-closing mode (Step S72 of FIG. 4: YES), that the closing operation signal of the BD opening/closing SW 3b, 4b, 6b is not transmitted (Step S73 of FIG. 4: YES), and that the back door 30 is at the fully closed position (Step S74 of FIG. 4: NO). In this case, the mode determining part 1g determines that the switching destination is a standby mode (Step S86 of FIG. 4).

Further, it is assumed that the vehicle is in the traveling state (Step S71 of FIG. 4: YES), that the current mode is neither the auto-opening mode nor the auto-closing mode (Step S72 of FIG. 4: YES), that the closing operation signal of the BD opening/closing SW 3b, 4b, 6b is not transmitted (Step S73 of FIG. 4: YES), and that the back door 30 is not at the fully closed position (Step S74 of FIG. 4: YES). In this case, the mode determining part 1g determines that the switching destination is the fixing control mode (Step S75 of FIG. 4).

Further, it is assumed that the vehicle is in the stopping state (Step S71 of FIG. 4: NO), that the current mode is not the fixing control mode (Step S79 of FIG. 4: YES), that the door position is not at the fully closed position (Step S80 of FIG. 4: YES), and that the manual operation of opening or closing the back door 30 is performed (Step S81 of FIG. 4: YES). In this case, the mode determining part 1g determines that the switching destination is a power assisting mode (Step S82 of FIG. 4).

Further, in the case of the vehicle being in the stopping state (Step S71 of FIG. 4: NO), when the current mode is the fixing control mode (Step S79 of FIG. 4: NO) or when the door position is at the fully closed position (Step S80 of FIG. 4: NO) or when the manual operation of opening or closing the back door 30 is not performed (Step S81 of FIG. 4: NO), the mode determining part 1g confirms the operation signal of the BD opening/closing SW 3b, 4b, 6b (Step S83 of FIG. 4).

Then, when the mode determining part 1g confirms that the operation signal acceptor 1s has accepted the closing operation signal of the BD opening/closing SW 3b, 4b, 6b since the closing operation is performed in any of the BD opening/closing SWs 3b, 4b, 6b (Step S83 of FIG. 4: YES, closing operation), the mode determining part 1g determines that the switching destination is the auto-closing mode (Step S84 of FIG. 4).

Further, when the mode determining part 1g confirms that the operation signal acceptor 1s has accepted the opening operation signal of the BD opening/closing SW 3b, 4b, 6b since the opening operation has been performed in any of the BD opening/closing SWs 3b, 4b, 6b (Step S83 of FIG. 4: YES, opening operation), the mode determining part 1g determines that the switching destination is the auto-opening mode (Step S85 of FIG. 4).

Moreover, when the mode determining part 1g confirms that the operation signal acceptor 1s has not accepted the opening/closing operation signal of the BD opening/closing SW 3b, 4b, 6b since the opening/closing operation has not been performed in the BD opening/closing SWs 3b, 4b, 6b (Step S83 of FIG. 4: NO), the mode determining part 1g determines that the switching destination is the standby mode (Step S86 of FIG. 4).

<Standby Mode>

When the mode is switched from Step S7 of FIG. 3 to the standby mode in accordance with a result of the determination in the mode determining process of FIG. 4, the controller 1 brings a circuit of the motor driving part 2 into an open state so as not to allow passage of a current in the motor 20, and completes the main process.

<Auto-Opening Mode>

When the mode is switched from Step S7 of FIG. 3 to the auto-opening mode in accordance with a result of the determination in the mode determining process of FIG. 4, the controller 1 executes an auto-opening process (Step S11 of FIG. 3).

Figure 5:
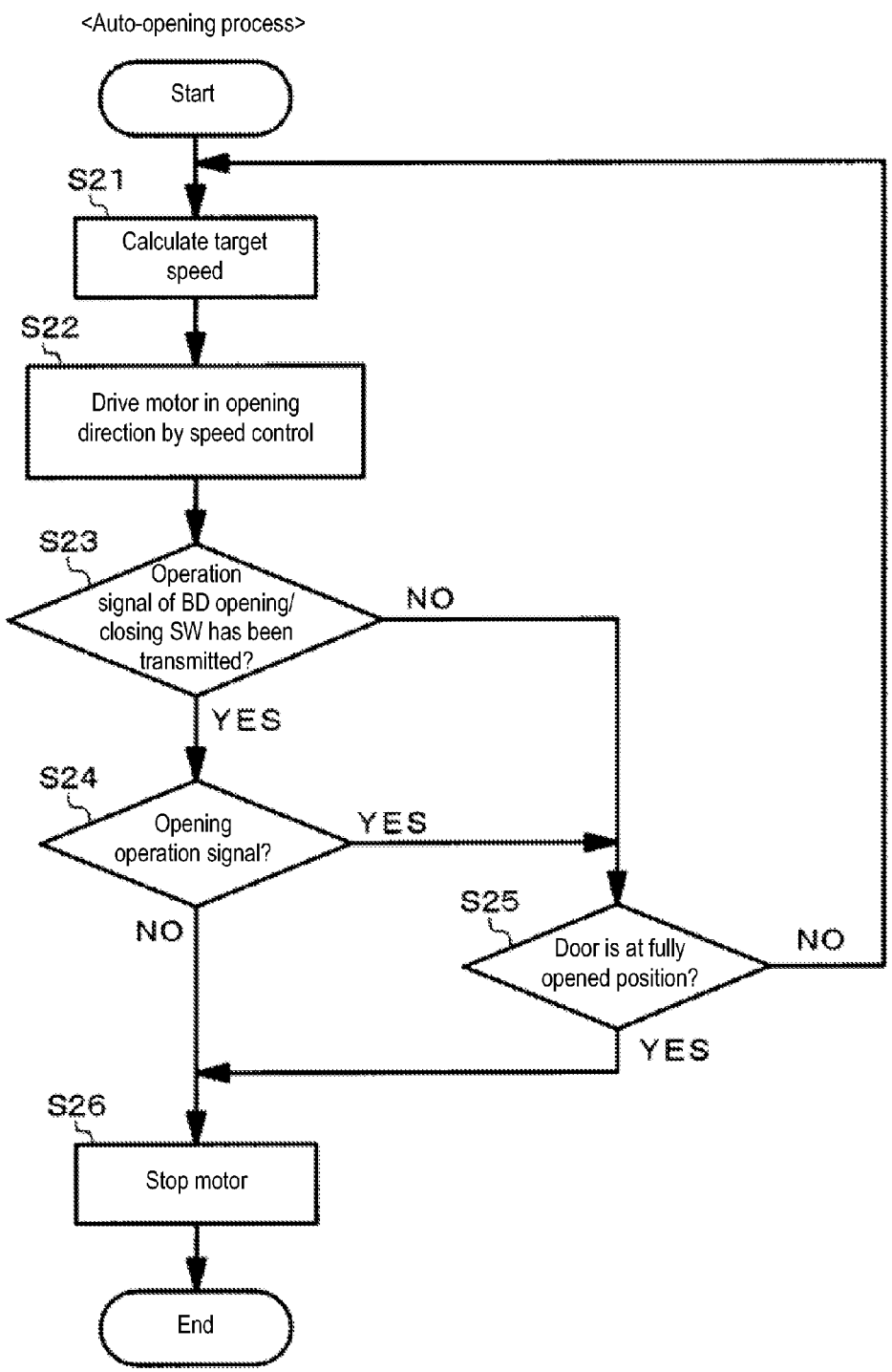
FIG. 5 is a flowchart showing a detail of an auto-opening process of FIG. 3.
Figure 7:
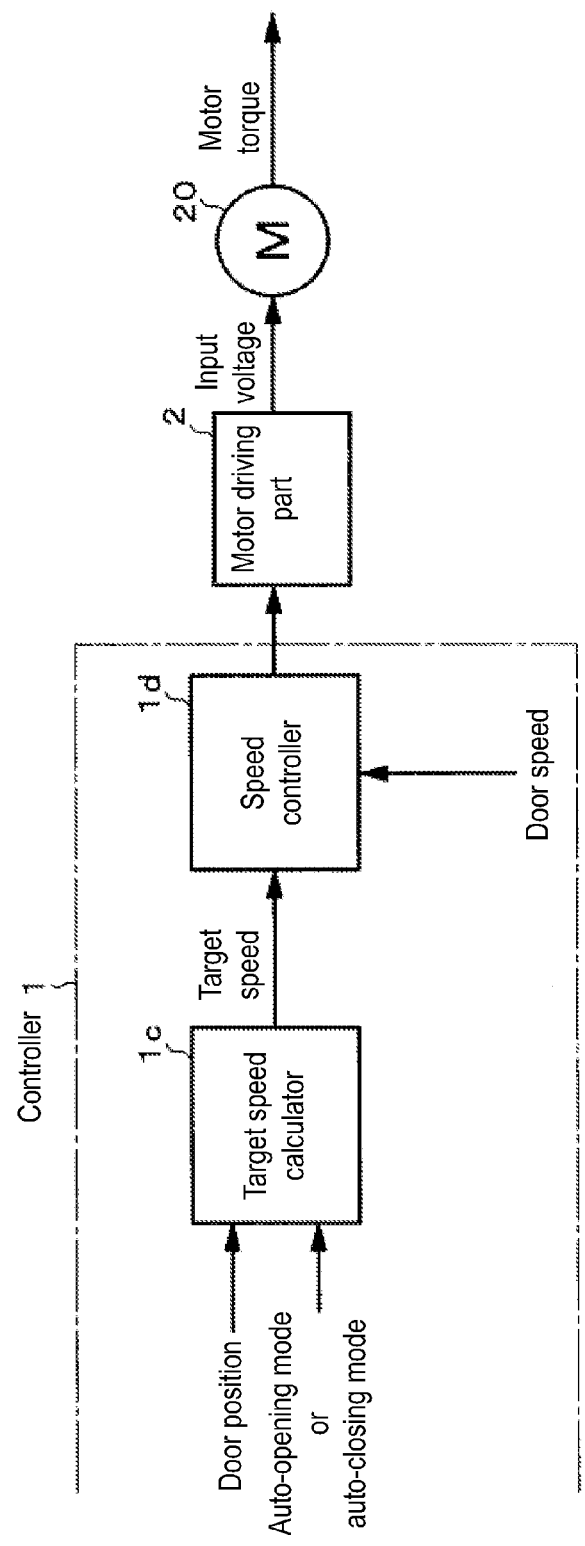
FIG. 7 is a block diagram showing a detail of the auto-opening process and the auto-closing process of FIG. 3.

FIG. 5 is a flowchart showing a detail of the auto-opening process. FIG. 7 is a block diagram showing a detail of the auto-opening process and an auto-closing process.

When the auto-opening process is started, as shown in FIG. 7, the target speed calculator 1c calculates a target speed based on the door position detected in the position detector 1a (Step S21 of FIG. 5). Next, the speed controller 1d drives the motor 20 in the opening direction (e.g., normal rotation) while performing speed control (Step S22 of FIG. 5).

Specifically, the speed controller 1d controls an input voltage into the motor 20 by the motor driving part 2 such that the target speed calculated in the target speed calculator 1c agrees with the door speed calculated in the speed calculator 1b, to drive the motor 20 in the opening direction. This activates the BD opening/closing function 21, and the back door 30 is automatically getting open.

Thereafter, when the operation signals of the BD opening/closing SWs 3b, 4b, 6b are not transmitted (Step S23 of FIG. 5: NO), the processes of Steps S21 to S25 are repeated until the back door 30 reaches the fully opened position (Step S25 of FIG. 5: NO).

Further, even when any of the BD opening/closing SWs 3b, 4b, 6b is operated and the operation signal of the BD opening/closing SW 3b, 4b, 6b is transmitted (Step S23 of FIG. 5: YES), it is assumed that that is the opening operation signal (Step S24 of FIG. 5: YES). Then, the processes of Steps S21 to S25 are repeated until the back door 30 reaches the fully opened position (Step S25 of FIG. 5: NO).

Moreover, even when the operation signal is transmitted from any of the BD opening/closing SWs 3b, 4b, 6b (Step S23 of Step 5: YES), if that is an operation signal (closing operation signal or stopping operation signal) other than the opening operation signal (Step S24 of FIG. 5: NO), the previously accepted opening operation signal becomes invalid. Accordingly, the controller 1 stops the driving of the motor 20 (Step S26 of FIG. 5), to complete the auto-opening process. Subsequently, the main process of FIG. 3 and the mode determining process of FIG. 4 are executed again, and the mode is switched to the auto-closing mode, the standby mode or the like.

As another example, in Step S23 of FIG. 5, when the operation signal of the BD opening/closing SW 3b, 4b, 6b is transmitted, no matter whether the operation signal is the opening operation signal or the closing operation signal, the driving of the motor 20 may be once stopped or the rotating direction of the motor 20 may be reversed.

Further, it is assumed that an operation other than the opening operation is not performed in the BD opening/closing SWs 3b, 4b, 6b and the back door 30 has reached the fully opened position. In this case, the controller 1 judges that the operation signal of the BD opening/closing SW 3*b*, 4*b*, 6*b* has not been transmitted (Step S23 of FIG. 5: NO) or the opening operation signal has been transmitted (Step S24 of FIG. 5: YES). Thereafter, the controller 1 judges that the back door 30 is at the fully opened position based on the door position detected in the position detector 1*a* (Step S25 of FIG. 5: YES). The controller 1 then stops the driving of the motor 20 (Step S26 of FIG. 5), to complete the auto-opening process.

<Auto-Closing Mode>

When the mode is switched from Step S7 of FIG. 3 to the auto-closing mode in accordance with a result of the determination in the mode determining process of FIG. 4, the controller 1 executes the auto-closing process (Step S10 of FIG. 3).

Figure 6:
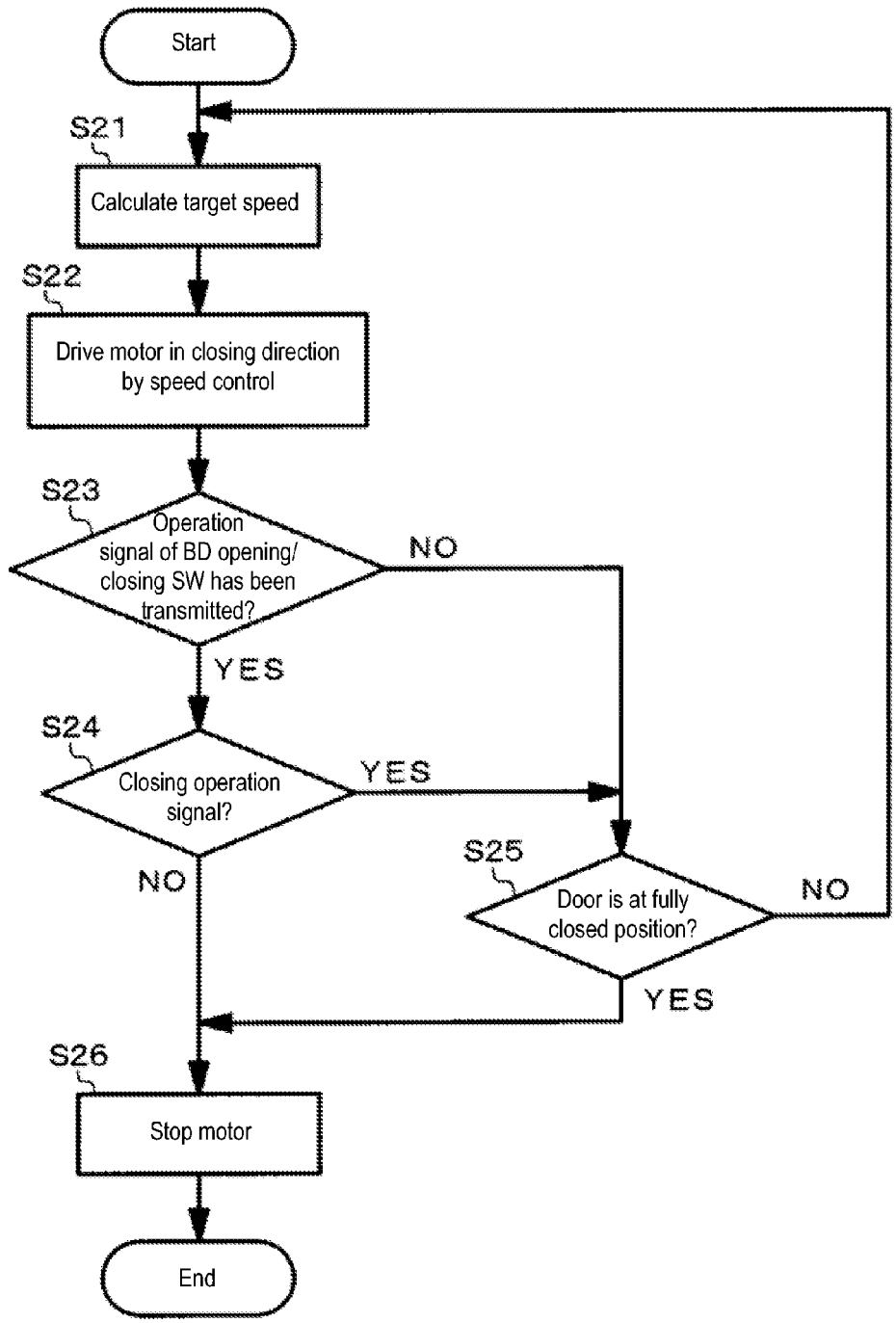
FIG. 6 is a flowchart showing a detail of an auto-closing process of FIG. 3.

FIG. 6 is a flowchart showing a detail of the auto-closing process. When the auto-closing process is started, as shown in FIG. 7, the target speed calculator 1*c* calculates a target speed based on the door position detected in the position detector 1*a* (Step S31 of FIG. 6). Next, the speed controller 1*d* drives the motor 20 in a closing direction (e.g., reverse rotation) while performing speed control (Step S32 of FIG. 6).

Specifically, the speed controller 1*d* controls an input voltage into the motor 20 by the motor driving part 2 such that the target speed calculated in the target speed calculator 1*c* agrees with the door speed calculated in the speed calculator 1*b*, to drive the motor 20 in the closing direction. This activates the BD opening/closing function 21, and the back door 30 is automatically getting closed.

Thereafter, when the operation signals of the BD opening/closing SWs 3*b*, 4*b*, 6*b* are not transmitted (Step S33 of FIG. 6: NO), the processes of Steps S31 to S35 are repeated until the back door 30 reaches the fully closed position (Step S35 of FIG. 6: NO).

Further, it is assumed that, even when any of the BD opening/closing SWs 3*b*, 4*b*, 6*b* is operated and the operation signal of the BD opening/closing SW 3*b*, 4*b*, 6*b* is transmitted (Step S33 of FIG. 6: YES), that is the closing operation signal (Step S34 of FIG. 6: YES). Then, the processes of Steps S31 to S35 are repeated until the back door 30 reaches the fully closed position (Step S35 of FIG. 6: NO).

Moreover, even when the operation signal is transmitted from any of the BD opening/closing SWs 3*b*, 4*b*, 6*b* (Step S33 of Step 6: YES), if that is an operation signal (opening operation signal or stopping operation signal) other than the closing operation signal (Step S34 of FIG. 6: NO), the previously accepted closing operation signal becomes invalid. Accordingly, the controller 1 stops the driving of the motor 20 (Step S36 of FIG. 6), to complete the auto-closing process. Subsequently, the main process of FIG. 3 and the mode determining process of FIG. 4 are executed again, and the mode is switched to the auto-opening mode, the standby mode or the like.

As another example, in Step S33 of FIG. 6, when the operation signal of the BD opening/closing SW 3*b*, 4*b*, 6*b* is transmitted, no matter whether the operation signal is the opening operation signal or the closing operation signal, the driving of the motor 20 may be once stopped or the rotating direction of the motor 20 may be reversed.

Further, it is assumed that an operation other than the closing operation is not performed in the BD opening/closing SWs 3*b*, 4*b*, 6*b* and the back door 30 has reached the fully closed position. In this case, the controller 1 judges that the operation signal of the BD opening/closing SW 3*b*, 4*b*, 6*b* has not been transmitted (Step S33 of FIG. 6: NO) or the closing operation signal has been transmitted (Step S34 of FIG. 6: YES). Thereafter, the controller 1 judges that the back door 30 is at the fully closed position based on the door position detected in the position detector 1*a* (Step S35 of FIG. 6: YES). Then, the controller 1 stops the driving of the motor 20 (Step S36 of FIG. 6), to complete the auto-closing process.

<Power Assisting Mode>

When the mode is switched from Step S7 of FIG. 3 to the power assisting mode in accordance with a result of the determination in the mode determining process of FIG. 4, the controller 1 executes a power assisting process (Step S9 of FIG. 3).

Figure 8:
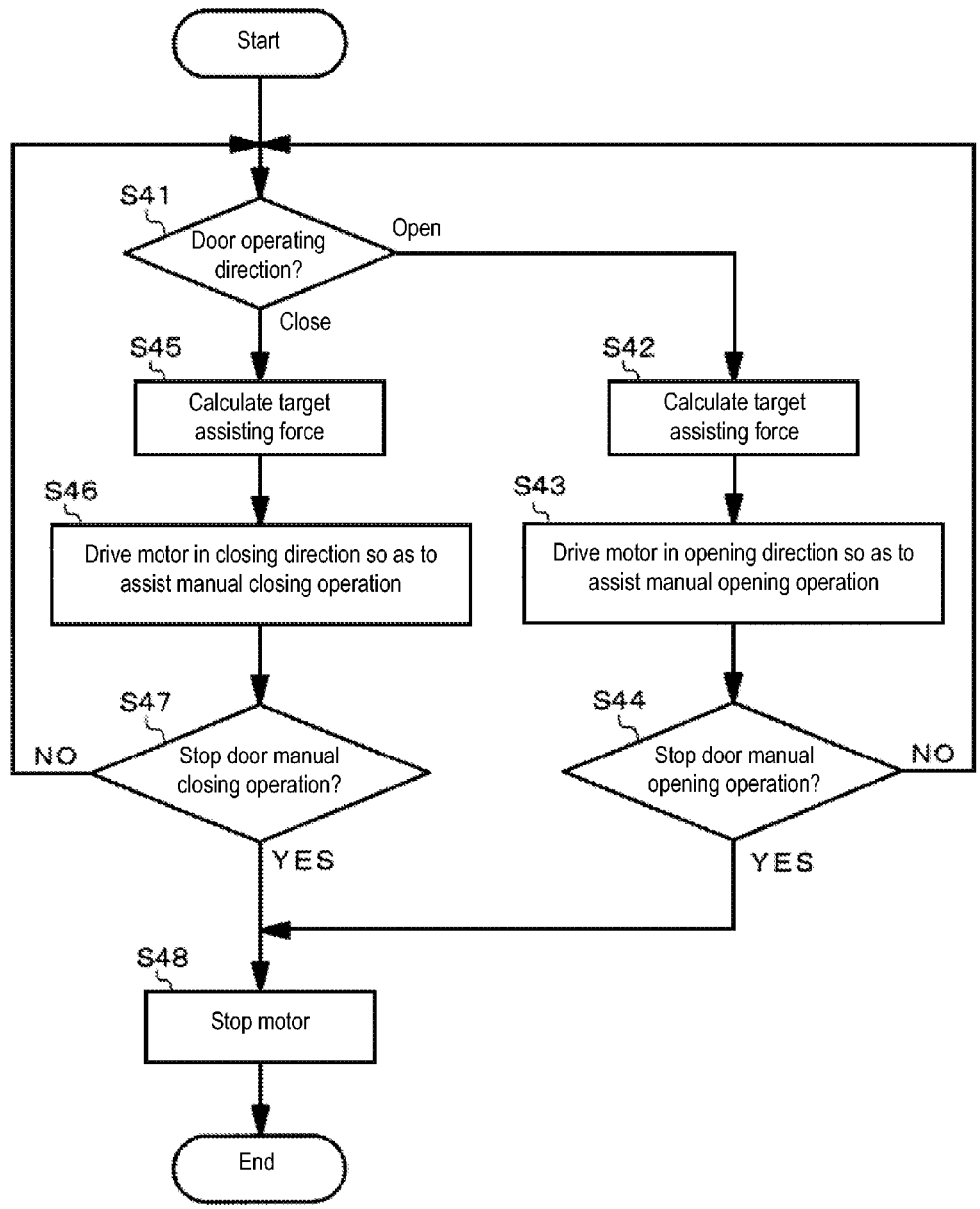
FIG. 8 is a flowchart showing a detail of a power assisting process of FIG. 3.
Figure 9:
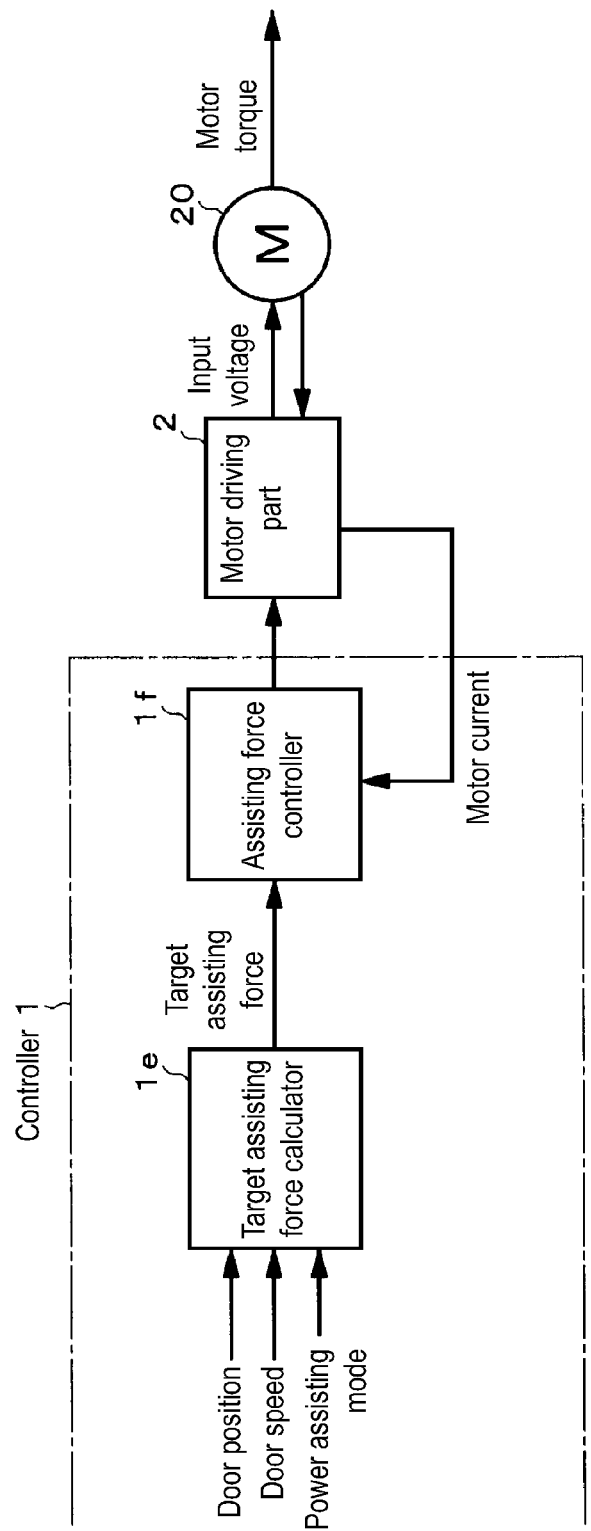
FIG. 9 is a block diagram showing a detail of the power assisting process of FIG. 3.
Figure 10:
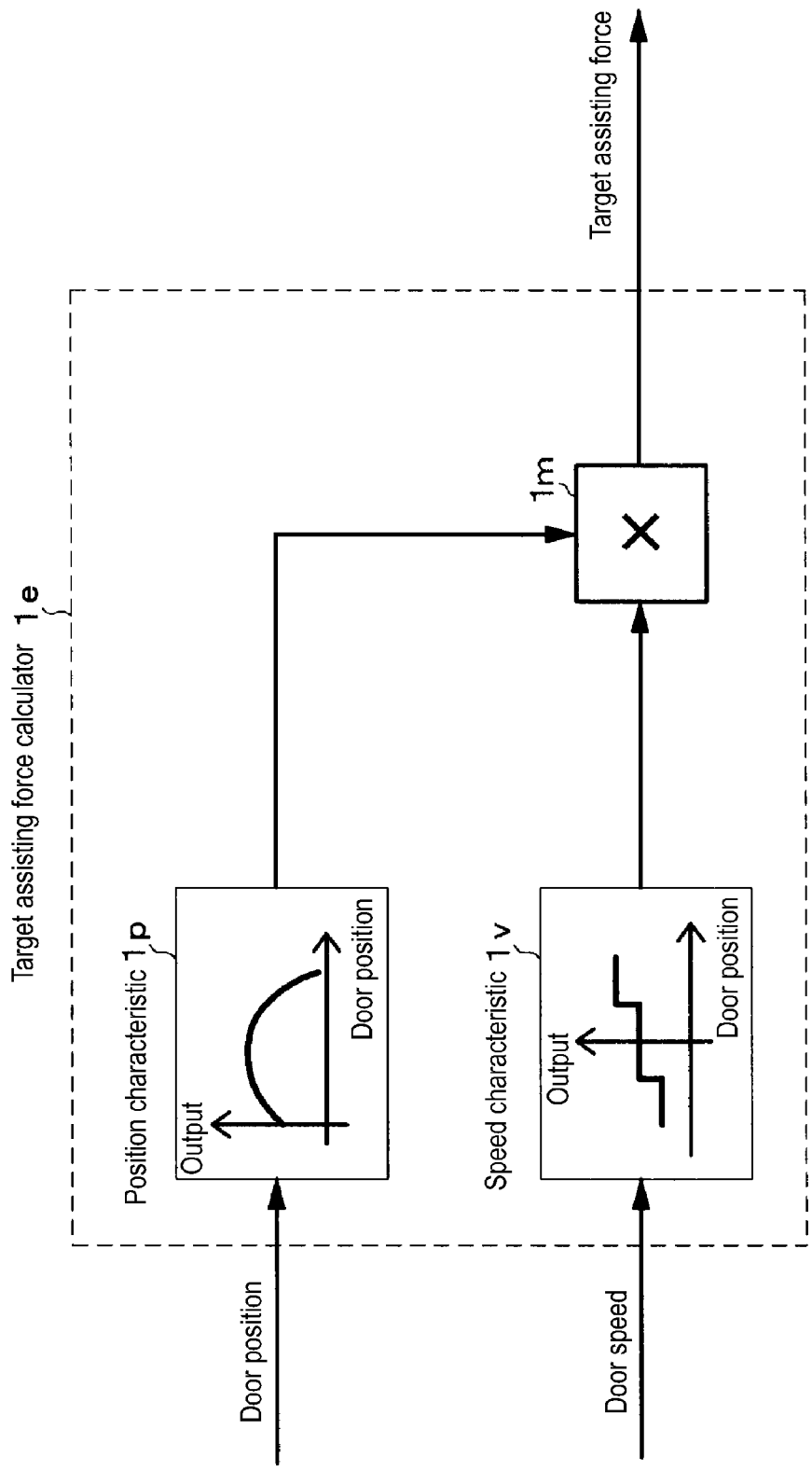
FIG. 10 is a diagram showing a detail of a target assisting force calculator of FIG. 9.

FIG. 8 is a flowchart showing a detail of the power assisting process. FIG. 9 is a block diagram showing a detail of the power assisting process. FIG. 10 is a block diagram showing a detail of the target assisting force calculator 1*e*.

When the power assisting process is started, first, the controller 1 judges the operating direction (opening/closing direction) of the back door 30 based on a temporal change in the door position detected in the position detector 1*a* (Step S41 of FIG. 8). At this time, when the controller 1 judges that the operating direction of the back door 30 is the opening direction (Step S41 of FIG. 8: Open), as shown in FIG. 9, the target assisting force calculator 1*e* calculates target assisting force for the opening operation based on the door position detected in the position detector 1*a* and the door speed calculated in the speed calculator 1*b* (Step S42 of FIG. 8).

Specifically, as shown in FIG. 10, the target assisting force calculator 1*e* is provided with a position characteristic 1*p* showing an assisting force component in accordance with a door position, a speed characteristic 1*v* showing an assisting force component in accordance with a door speed, and a multiplier 1*m*. When the door position detected in the position detector 1*a* is inputted, an assisting force component in accordance with the door position is outputted by the position characteristic 1*p*. Further, when the door speed calculated in the speed calculator 1*b* is inputted, an assisting force component in accordance with the door speed is outputted by the speed characteristic 1*v*. Then, these two assisting force components are multiplied in the multiplier 1*m*, and target assisting force is thereby calculated.

When the target assisting force for the opening operation is calculated in the target assisting force calculator 1*e*, as shown in FIG. 9, the assisting force controller 1*f* drives the motor 20 in the opening direction so as to assist the manual operation of opening the back door 30 based on the above target assisting force and the motor current detected in the current detector 2*a* (Step S43 of FIG. 8).

Specifically, the assisting force controller 1*f* controls an input voltage into the motor 20 by the motor driving part 2 in accordance with the target assisting force and the motor current, to drive the motor 20 in the opening direction. Accordingly, a motor torque outputted from the motor 20 serves as the operation assisting force, thus leading to reduction in operation force at the time of the user manually opening the back door 30.

Thereafter, when the user stops the manual operation of opening the back door 30, the manual opening/closing detector 1*h* judges that the manual operation of opening the back door 30 has been stopped (Step S44 of FIG. 8: YES). The controller 1 then stops the driving of the motor 20 (Step S48 of FIG. 8), to complete the power assisting process. Accordingly, the back door 30 stands still at the intermediate position between the fully closed position and the fully opened position.

Further, when the user continues the manual operation of opening the back door 30, the manual opening/closing detector 1h judges that the manual operation of opening the back door 30 has not been stopped (Step S44 of FIG. 8: NO). In this case, the processes of Steps S41 to S44 of FIG. 8 are repeated. Subsequently, when the back door 30 reaches the fully opened position, the manual operation of opening the back door 30 is stopped (Step S44 of FIG. 8: YES). Hence the controller 1 stops the driving of the motor 20 (Step S48 of FIG. 8), to complete the power assisting process.

On the other hand, immediately after the start of the power assisting process, when the controller 1 judges that the operating direction of the back door 30 is the closing direction (Step S41 of FIG. 8: Close), as shown in FIG. 9, the target assisting force calculator 1e calculates target assisting force for the closing operation based on the door position detected in the position detector 1a and the door speed calculated in the speed calculator 1b (Step S45 of FIG. 8).

Also at this time, as shown in FIG. 10, in the target assisting force calculator 1e, an assisting force component in accordance with the door position is outputted by the position characteristic 1p and an assisting force component in accordance with the door speed is outputted by the speed characteristic 1v. Then, these two assisting force components are multiplied in the multiplier 1m, and target assisting force is thereby calculated. It is to be noted that the position characteristic 1p and the speed characteristic 1v for the closing operation may be different from the position characteristic 1p and the speed characteristic 1v for the opening operation, or may be the same as those.

When the target assisting force for the closing operation is calculated in the target assisting force calculator 1e, as shown in FIG. 9, the assisting force controller 1f drives the motor 20 in the closing direction so as to assist the manual operation of closing the back door 30 based on the above target assisting force and the motor current (Step S46 of FIG. 8).

Specifically, the assisting force controller 1f controls an input voltage into the motor 20 by the motor driving part 2 in accordance with the target assisting force and the motor current, to drive the motor 20 in the closing direction. Accordingly, a motor torque outputted from the motor 20 serves as the operation assisting force, thus leading to reduction in operation force at the time of the user manually closing the back door 30.

Thereafter, when the user stops the manual operation of closing the back door 30, the manual opening/closing detector 1h judges that the manual operation of closing the back door 30 has been stopped (Step S47 of FIG. 8: YES). The controller 1 then stops the driving of the motor 20 (Step S48 of FIG. 8), to complete the power assisting process. Accordingly, the back door 30 stands still at the intermediate position.

Further, when the user continues the manual operation of closing the back door 30, the manual opening/closing detector 1h judges that the manual operation of closing the back door 30 has not been stopped (Step S47 of FIG. 8: NO). In this case, the processes of Steps S41 and S45 to S47 of FIG. 8 are repeated. Subsequently, when the back door 30 reaches the fully closed position, the manual operation of closing the back door 30 is stopped (Step S47 of FIG. 8: YES). Hence the controller 1 stops the driving of the motor 20 (Step S48 of FIG. 8), to complete the power assisting process.

<Fixing Control Mode>

When the mode is switched from Step S7 of FIG. 3 to the fixing control mode in accordance with a result of the determination in the mode determining process of FIG. 4, the controller 1 executes a fixing control process (Step S8 of FIG. 3).

Figure 11:
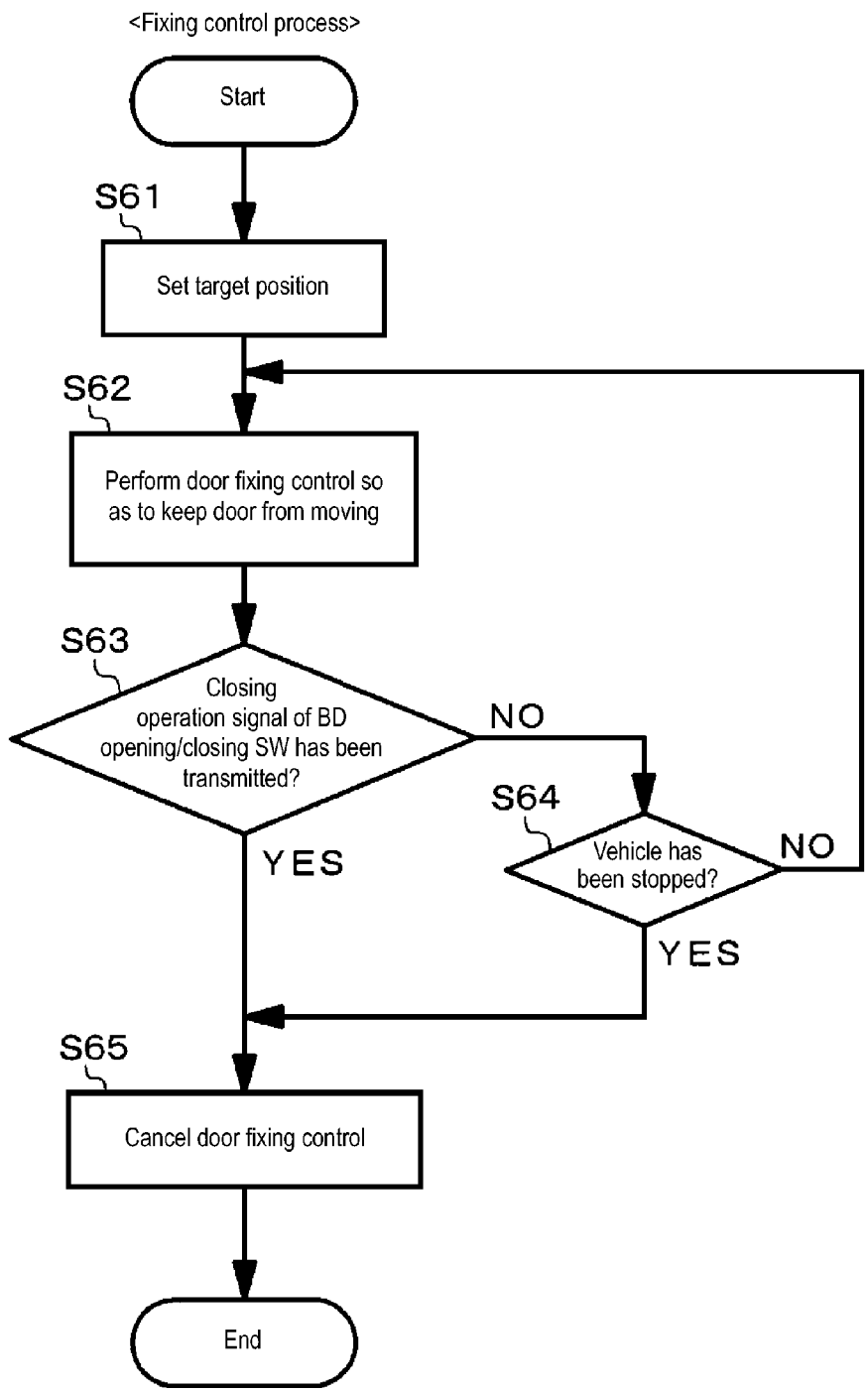
FIG. 11 is a flowchart showing a detail of a fixing control process of FIG. 3.
Figure 12:
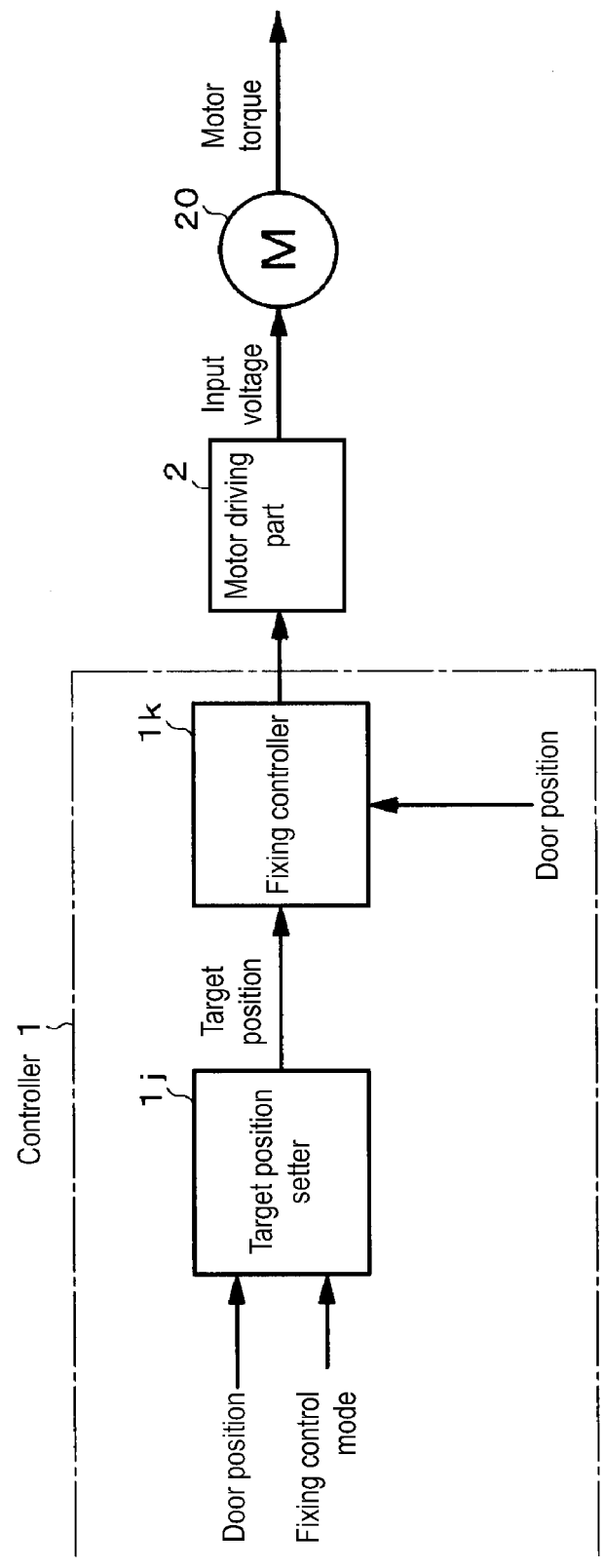
FIG. 12 is a block diagram showing a detail of the fixing control process of FIG. 3.

FIG. 11 is a flowchart showing a detail of the fixing control process. FIG. 12 is a block diagram showing a detail of the fixing control process.

When the fixing control process is started, as shown in FIG. 12, the target position setter 1j sets a target position for fixing the back door 30 based on the door position detected by the position detector 1a (Step S61 of FIG. 11). Specifically, the current door position detected in the position detector 1a is set as the target position.

Then, based on the target position set in the target position setter 1j and a door position detected as needed in the position detector 1a, the fixing controller 1k performs fixing control of the back door 30 so as to keep the back door 30 from moving (Step S62 of FIG. 11). Specifically, as shown in FIG. 12, the fixing controller 1k controls an input voltage into the motor 20 by the motor driving part 2 such that the target position agrees with the door position (feedback control). This fixing control of the back door 30 is repeatedly executed while the closing operation signal of the BD opening/closing SW 3b, 4b, 6b is not transmitted (Step S63 of FIG. 11: NO) and the vehicle is in the traveling state (Step S64 of FIG. 11: NO). Accordingly, even when the back door 30 is open during traveling of the vehicle, the back door 30 does not move in the opening or closing direction.

On the other hand, when any of the BD opening/closing SWs 3b, 4b, 6b is operated for closing during fixing control of the back door 30, the operation signal acceptor 1s accepts the closing operation signal of any of the BD opening/closing SWs 3b, 4b, 6b (Step S63 of FIG. 11: YES). Then, the controller 1 cancels (stops) fixing control of the back door 30 (Step S65 of FIG. 11), to complete the fixing control process.

Subsequently, the main process of FIG. 3 and the mode determining process of FIG. 4 are executed again, and when the vehicle is in the traveling state (Step S71 of FIG. 4: YES), the mode is switched to the auto-closing mode through Steps S72, S73, S77, S84 of FIG. 4. Further, when the vehicle is in the stopping state (Step S71 of FIG. 4: NO), the mode is switched to the auto-closing mode through Steps S79, S83 and S84 of FIG. 4. Then, the auto-closing process of FIG. 6 is executed, whereby the driving of the motor 20 is driven in the closing direction and the back door 30 is automatically getting closed.

Further, it is assumed that during the fixing control of the back door 30 (Step S62 of FIG. 11), the vehicle is stopped (Step S64 of FIG. 11: YES) in a state where the closing operation signal of the BD opening/closing SW 3b, 4b, 6b has not been transmitted (Step S63 of FIG. 11: NO). Also in this case, the controller 1 cancels the fixing control of the back door 30 (Step S65 of FIG. 11), to complete the fixing control process. Subsequently, the main process of FIG. 3 and the mode determining process of FIG. 4 are executed again, and the mode is switched to a mode other than the fixing control mode.

According to the above embodiment, since the back door 30 is fixed so as not to move during traveling of the vehicle, it is possible to prevent the back door 30 from being operated in an opening or closing direction without the user's intention due to acceleration of the vehicle, gravity applied to the back door 30, vibration caused by roughness of a road, or external force such as impact. Further, even if the vehicle is travelled with the back door 30 in the open state, the back door 30 does not move from that position, whereby it is possible to improve the usability of the back door 30 while ensuring safety.

Further, in the above embodiment, when the vehicle is in the traveling state and the back door 30 is not at the fully closed position, the motor 20 is controlled, to fix the back door 30. For example, in order to carry large luggage by the vehicle, the user loads the large luggage on a back cargo bed of the vehicle. Even when, the back door 30 cannot be completely closed and the vehicle is travelled with the back door 30 in a moderately open state, the back door 30 is fixed so as not to move. Accordingly, it is possible to prevent unintentional operation of the back door 30 while improving the usability of the back door 30, and it is further possible to ensure safety. Further, the existing motor 20 as a driving source for opening or closing the back door 30 is feedback-controlled, to fix the back door 30 to a position other than the fully closed position. This eliminates the need for a part or a mechanism for separately fixing the back door 30, to prevent the configuration from becoming complex.

Further, in the above embodiment, once the fixing control of the back door 30 is started, the fixing control of the back door 30 is continued until the vehicle is stopped. Accordingly, it is possible to prevent the back door 30 from being operated in the opening or closing direction without the user's intention due to deceleration of the vehicle immediately before stopping of the vehicle, and the like.

Further, in the above embodiment, when the closing operation signal of the BD opening/closing SW 3*b*, 4*b*, 6*b* is accepted during fixing control of the back door 30, the fixing control of the back door 30 is cancelled and control is performed so as to close the back door 30. Moreover, when the vehicle is travelled with the back door 30 in the open state, the back door 30 can be closed by performing the closing operation of any of the BD opening/closing SWs 3*b*, 4*b*, 6*b*, whereby it is possible to further improve the usability of the back door 30.

Further, in the above embodiment, the power back door control device 10 is provided with not only the auto-opening/closing function but also the power assisting function. Hence it is possible to automatically open or close the back door 30 by the opening/closing operation of the BD opening/closing SW 3*b*, 4*b*, 6*b*. Moreover, when the manual operation of opening or closing the back door 30 is performed during stopping of the vehicle, operation assisting force is applied by the motor 20, to allow reduction in load of the user performing the operation.

Further, with the power assisting function is provided, when the vehicle is travelled while the back door 30 is in the open state, external force is applied to the door, which may cause erroneous detection that manual operation of opening or closing the back door 30 has been performed. Therefore, in the above embodiment, the back door 30 is fixed during traveling of the vehicle with the back door 30 in the open state, it is possible to prevent unintentional operation of the back door 30 due to the power assisting function erroneously not working.

The disclosure is applicable to a variety of embodiments other than those described above. For example, in the above embodiment the example has been shown where the closing operation signal of the BD opening/closing SW 3*b*, 4*b*, 6*b* is accepted and the back door 30 is closed during traveling of the vehicle, but the disclosure is not restricted only to this. Other than this, during traveling of the vehicle, for example, the opening operation signal or the stopping operation signal of the BD opening/closing SW 3*b*, 4*b*, 6*b* may be accepted, and the back door 30 may be opened or stopped. Further, during traveling of the vehicle, for example, all the operation signals of the BD opening/closing SW 3*b*, 4*b*, 6*b* may be accepted, and the back door 30 may be closed with respect to any of the operation signals. Moreover, during traveling of the vehicle, it is difficult to operate the BD opening/closing SW 4*b* of the back operation part 4 and it is also difficult for a driver to operate the BD opening/closing SW 6*b* of the remote controller 6. Thus, for example, only the operation signal of the BD opening/closing SW 3*b* of the driver's seat operation part 3 may be accepted, and the back door 30 may be opened, closed or stopped.

Further, in the above embodiment, the example has been shown where the motor 20 has been feedback-controlled such that the target position set in the target position setter 1*j* agrees with the door position detected as needed in the position detector 1*a*, to perform fixing control of the back door 30 so as to keep the back door 30 from moving. However, the disclosure is not restricted only to this. Other than this, for example, the motor 20 may be functioned as an electric generator, and the back door 30 may be braked by the motor 20, to perform fixing control of the back door 30 so as to keep the back door 30 from moving. Moreover, for example, a plurality of motor terminals for allowing a current to flow in the motor 20 may be brought into a short-circuited state and an input voltage into the motor 20 may be constantly set at 0 V, to perform fixing control of the back door 30 so as to keep the back door 30 from moving.

Further, in the above embodiment, the example has been shown where the manual opening/closing detector 1*h* detects the manual operation of opening or closing the back door 30 based on the opening/closing speed of the back door 30 (door speed) calculated by the speed calculator 1*b*, but the disclosure is not restricted only to this. Other than this, for example, the manual opening/closing detector 1*h* may detect the manual operation of opening or closing the back door 30 based on a temporal change in the opening/closing position (door position) of the back door 30 detected by the position detector 1*a*. Moreover, for example, a load applied to the motor 20 or the back door 30 may be detected based on a motor current detected in the current detector 2*a*, and the manual opening/closing detector 1*h* may detect the manual operation of opening or closing the back door 30 based on an amount of change in the load. Furthermore, for example, a sensor for sensing force, such as a force sensor, may be provided in the gripper of the back door 30, and based on an output signal of that sensor, the manual opening/closing detector 1*h* may detect the manual operation of opening or closing the back door 30.

Further, in the above embodiment, the example has been shown where the position detector 1*a* detects the opening/closing position of the back door 30 based on outputs of the pulse generator 7, the full-closing detection SW 8 and the full-opening detection SW 9, but the disclosure is not restricted only to this. Other than this, for example, the position detector may detect the opening/closing position of the back door based on outputs from a sensor and a switch, a current flowing in the motor or a frequency of a ripple included in the current flowing in the motor.

Further, the flip-up back door 30 has been shown as the example in the above embodiment, but the disclosure is not restricted only to this, and a back door of a type other than this may be used.

Further, in the above embodiment, the example has been cited where the disclosure is applied to the power back door control device 10 provided with the auto-opening/closing function and the power assisting function, but this is not restrictive. Other than this, for example, the disclosure is also applicable to a power back door control device provided only with the auto-opening/closing function. Moreover, the disclosure is also applicable to a door opening/closing control device which opens or closes the door only when the operation switch is being operated for opening or closing.

Further, in illustrative embodiments, the example is cited where the disclosure is applied to the power back door control device 10 of the automatic four-wheel car, but this is not restrictive. For example, the disclosure is also applicable to a door opening/closing control device such as a power slide door control device that opens or closes a slide door. Moreover, the disclosure is also applicable to a door opening/closing control device that opens or closes a door by an actuator other than the motor.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A door opening/closing control device, comprising:
    an operation signal acceptor configured to accept an operation signal of an operation switch for performing an operation of opening or closing a door of a vehicle;
    a controller configured to control opening/closing of the door via an actuator when the operation signal acceptor accepts the operation signal;
    a stopping state detector configured to detect whether or not the vehicle is in a stopping state based on information about traveling or stopping of the vehicle acquired by a vehicle-side unit;
    a position detector configured to detect an opening/closing position of the door;
    a speed calculator configured to calculate an opening/closing speed of the door; and
    a manual opening/closing detector configured to detect that the door has been manually opened or closed,
    wherein, when the stopping state detector detects that the vehicle is in the stopping state, and when the manual opening/closing detector detects that the door has been manually opened or closed, the controller calculates assisting force based on the opening/closing position of the door detected by the position detector and the opening/closing speed of the door calculated by the speed calculator, and controls the actuator based on the assisting force to control the opening/closing of the door, thereby assisting manual operation of opening or closing the door, and
    wherein, when the stopping state detector detects that the vehicle is not in the stopping state, regardless of whether the manual opening/closing detector detects that the door has been manually opened or closed, the controller performs fixing control of the door so as to keep the door from moving.

2. The door opening/closing control device according to claim 1,
    wherein, when the stopping state detector detects that the vehicle is not in the stopping state, the controller sets a current position of the door as a target position of the door based on the opening/closing position of the door detected by the position detector, and
    wherein, based on the target position set by the controller and a door position detected as needed in the position detector, the controller performs the fixing control of the door via the actuator so as to keep the door from moving.

* * * * *